United States Patent [19]
Takahashi

[11] Patent Number: 5,172,785
[45] Date of Patent: Dec. 22, 1992

[54] VEHICLE CONTROL SYSTEM ADJUSTABLE IN ACCORDANCE WITH DRIVER'S AGE AND CHARACTERISTIC

[75] Inventor: Hiroshi Takahashi, Zushi, Japan

[73] Assignee: Nissan Motor Co., Ltd., Yokohama, Japan

[21] Appl. No.: 716,808

[22] Filed: Jun. 19, 1991

[30] Foreign Application Priority Data

Jun. 19, 1990 [JP] Japan ................................ 2-158772

[51] Int. Cl.$^5$ .............................................. B62D 6/00
[52] U.S. Cl. .................................... 180/141; 180/79.1; 364/424.05
[58] Field of Search ..................... 180/79.1, 141, 142; 364/424.05

[56] References Cited

U.S. PATENT DOCUMENTS

| | | | |
|---|---|---|---|
| 3,878,915 | 4/1975 | Purland et al. ...................... | 180/170 |
| 4,705,130 | 11/1987 | Fukunaga et al. ............... | 180/141 X |
| 4,865,148 | 9/1989 | Marumoto et al. .................. | 180/141 |
| 5,124,920 | 6/1992 | Tamada et al. ................. | 364/424.05 |

FOREIGN PATENT DOCUMENTS 1-148660  6/1989  Japan.

OTHER PUBLICATIONS

"Ningen Kogaku (Human Engineering)", vol. 23, Special Edition, pp. 252-253.

Primary Examiner—Charles A. Marmor
Assistant Examiner—Carla Mattix
Attorney, Agent, or Firm—Foley & Lardner

[57] ABSTRACT

A control system for a vehicle such as an automobile comprises a device for storing data for determining a driver's age, a group of various sensors for sensing driver's operations and a controlling system which estimates a driver's characteristic from information supplied from the sensors, and which modifies a response characteristic of any one or more of steering system, brake system and accelerating system of the vehicle in accordance with the driver's age and the estimated driver's characteristic in order to make the vehicle easier for aged or unskilled drivers to control. When the driver is aged or unskilled, the controlling system advances the phase of the response characteristic.

26 Claims, 17 Drawing Sheets

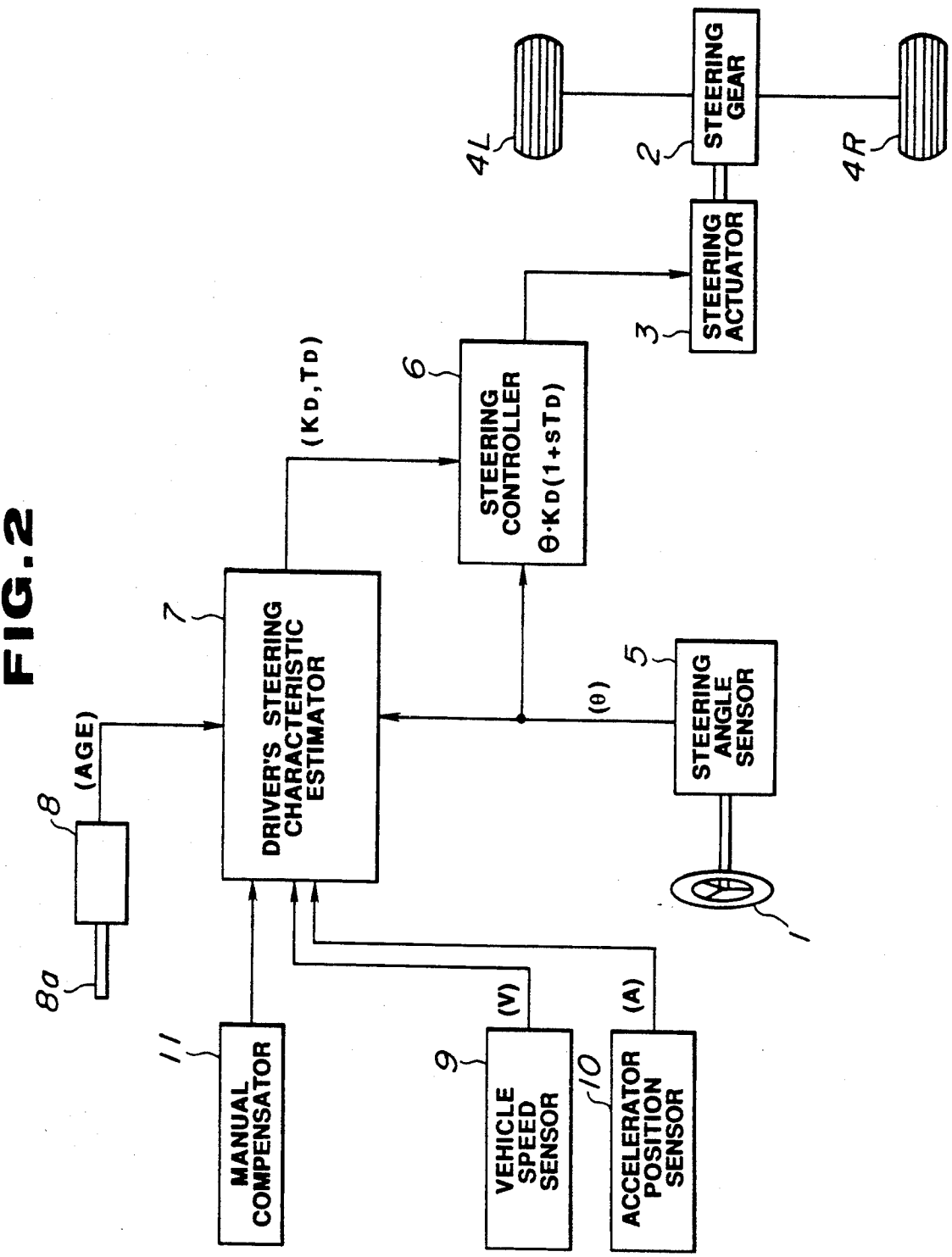

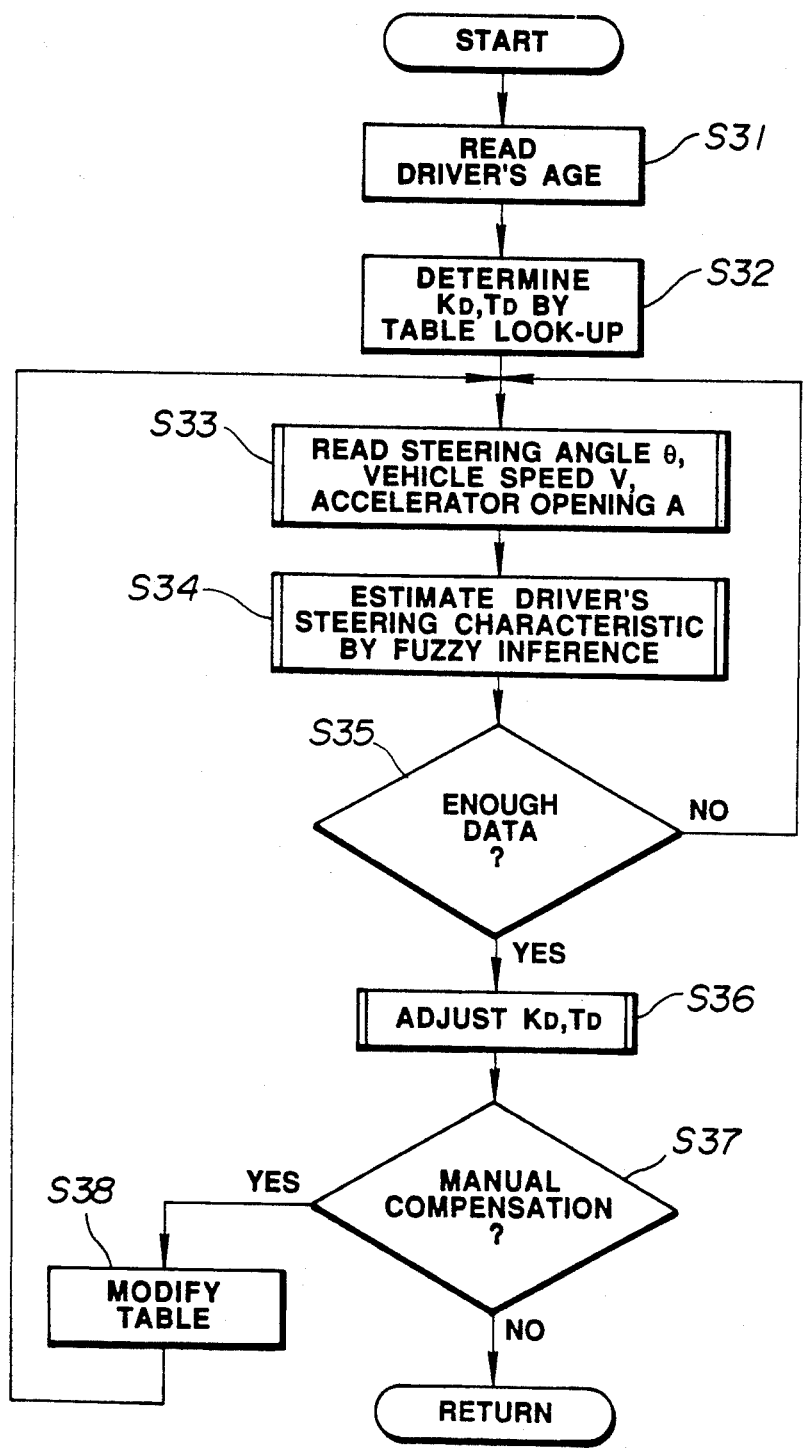

1.3
(CENTER OF GRAVITY)

0.6
(CENTER OF GRAVITY)

0.1
(CENTER OF GRAVITY)

-0.1
(CENTER OF GRAVITY)

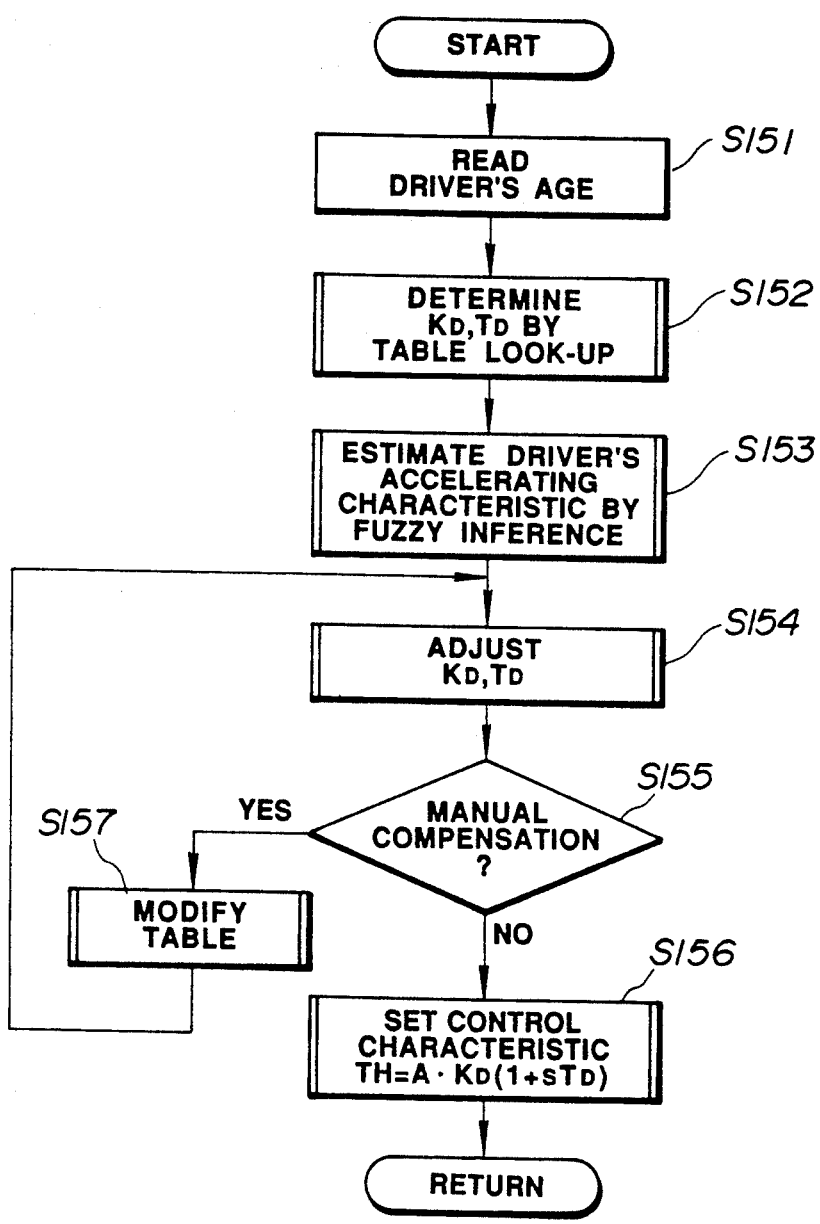

VEHICLE CONTROL SYSTEM ADJUSTABLE IN ACCORDANCE WITH DRIVER'S AGE AND CHARACTERISTIC

BACKGROUND OF THE INVENTION

The present invention relates to a vehicle control system designed to modify a response characteristic of a vehicle so as to make it easier for each individual driver to control the vehicle.

Generally, a motor vehicle has a steering system for steering the vehicle by responding to a steering input applied by a driver of the vehicle to a steering wheel, a brake system for decreasing the speed of the vehicle by responding to a brake input applied by the driver onto a brake pedal and an engine system for accelerating the vehicle by responding to an accelerator input applied to an accelerator pedal.

In typical conventional steering systems, a steering wheel is mechanically linked with front wheels. Japanese Patent Provisional (KOKAI) Publication No. 1-148660 discloses a steering system which includes both a mechanical steering linkage and an electric steering system. In typical conventional brake systems, a brake pedal is connected with a brake actuator by a brake hydraulic system. Some brake systems known as antiskid brake control systems (or wheel slip brake control systems) are designed to automatically control the degree of rotational wheel slip during braking. Some vehicles (BMW 750i) are equipped with a throttle-by-wire type accelerating system having an electronically controlled actuator for actuating a throttle valve.

However, these conventional systems take no account of the age and skill of each individual driver.

FIG. 20 shows human response characteristics (stimulus-response relationships) of human operators of various ages (disclosed in Magazine "NINGEN KOGAKU (Human Engineering)" Vol. 23, Special edition, pages 252-253 (D-2-10)). As to the response characteristic of a hand or foot of a human operator of the age greater than 60, a decline of the gain curve is steep over 0.1 Hz, and an increase of the phase delay is remarkable, as show in FIG. 20. Thus, the response characteristic of a human operator becomes worse as the age becomes higher.

Therefore, in an emergency, some of aged drivers are unable to steer the vehicle properly to circumvent an obstacle, or to brake the vehicle to avoid a collision, or to accelerate the vehicle properly.

SUMMARY OF THE INVENTION

It is an object of the present invention to provide a vehicle control system which can ensure a proper vehicle control performance even for aged or unskilled drivers.

According to the present invention, a control system for a vehicle such as a motor vehicle, comprises an input means, an actuator means, an age determining means, a sensing means and a controlling means. The input means is a means for producing an input signal representing a driver's command in accordance with a driver's operation. The input means may comprise a steering wheel, a brake pedal or an accelerator pedal, for example, and may be arranged to produce the input signal in the form of an electric, mechanical or hydraulic signal. The actuator means is a means for receiving a control signal which may be an electric, mechanical or hydraulic (fluid pressure) signal, and for varying a manipulated variable to control a motion of the vehicle in response to the control signal. The manipulated variable may be a steer angle of front or rear wheels of the vehicle, a brake actuation force of a brake system of the vehicle, or a throttle opening of an engine system of the vehicle. The age determining means is a means for producing an age signal representing a driver's age. The sensing means is a means for sensing the driver's operation to estimate a driver's operating characteristic. The controlling means is a means for producing the control signal from the input signal according to a predetermined control characteristic, estimating a driver's characteristic from a signal supplied from the sensing means, and adjusting the control characteristic in accordance with the driver's age and the estimated driver's characteristic.

The controlling means may comprises a controller means for producing the control signal in response to the input signal according to a predetermined transfer function (input-output relationship), and an adjusting means for adjusting the transfer function of the controller means. Alternatively, the controlling means may consist of only the adjusting means. In this case, the controller means is external to the controlling means.

The thus-constructed control system according to the present invention can ensure proper performances of a vehicle which can be regarded as a man-machine system, even if the phase delay of the human side is increased.

BRIEF DESCRIPTION OF THE DRAWINGS

FIG. 2 is a schematic view showing a steering control system according to the first embodiment of the present invention.

FIG. 3 is a flowchart showing a control program employed in the control system of the first embodiment.

FIG. 15 is a flowchart showing a control program employed in the third embodiment.

DETAILED DESCRIPTION OF THE INVENTION

Figure 1:
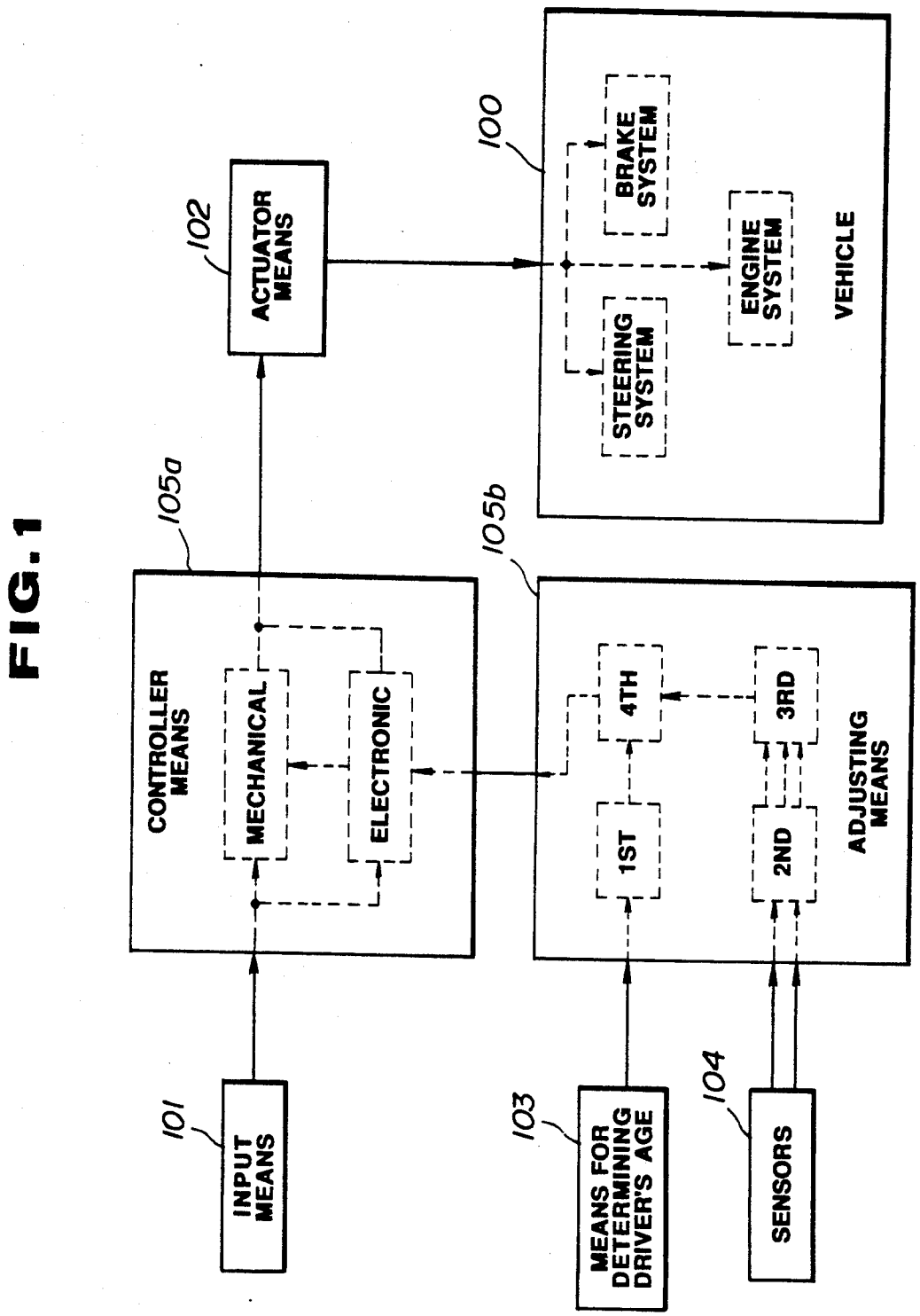
FIG. 1 is a block diagram illustrating connections of various means used in first, second and third embodiments of the present invention.
Figure 4A:
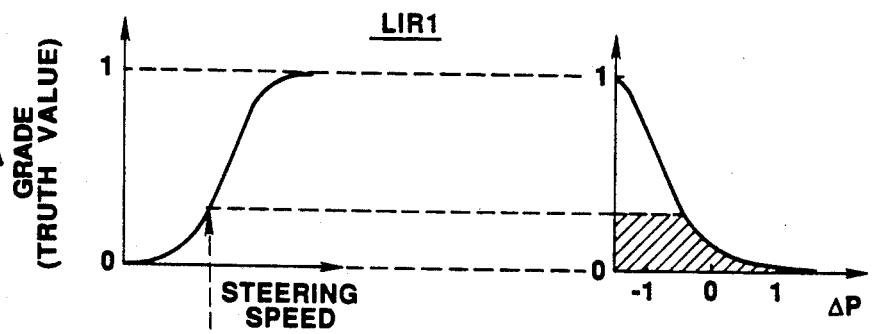
FIGS. 4A through 4D and 5A through 5D are graphs showing membership functions used in a fuzzy inference according to the first embodiment.
Figure 4B:
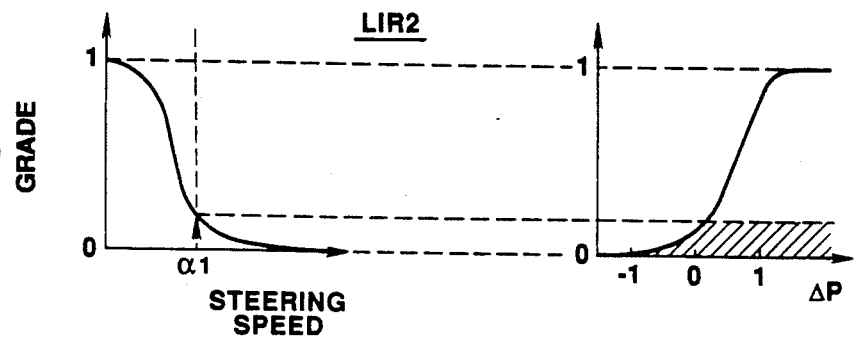
Figure 4C:
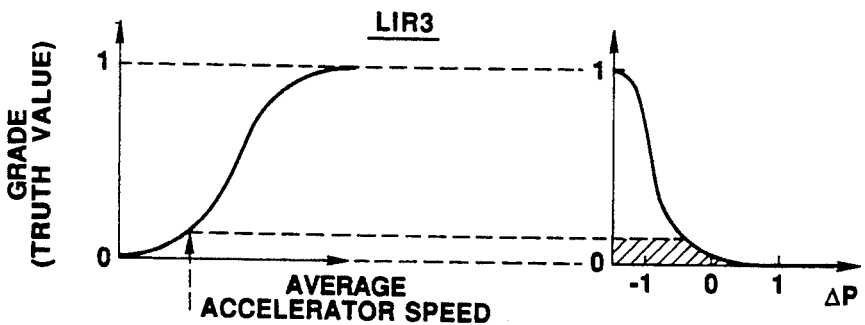
Figure 4D:
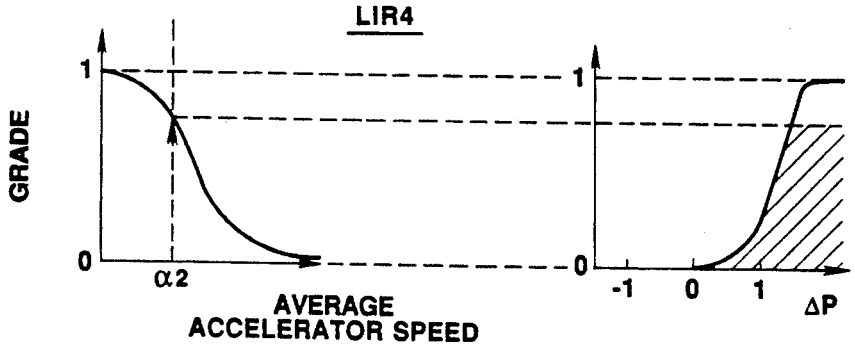
Figure 5A:
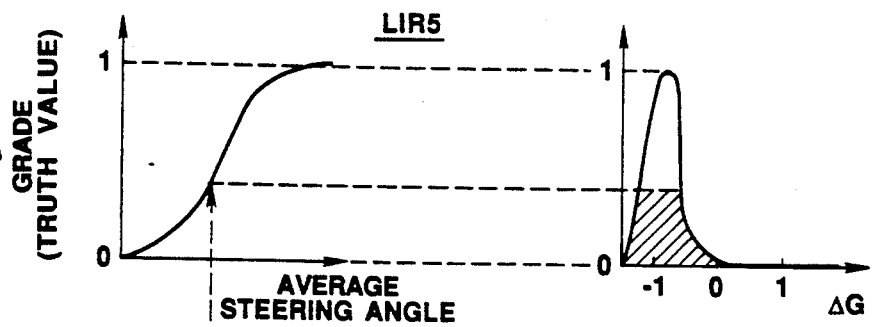
Figure 5B:
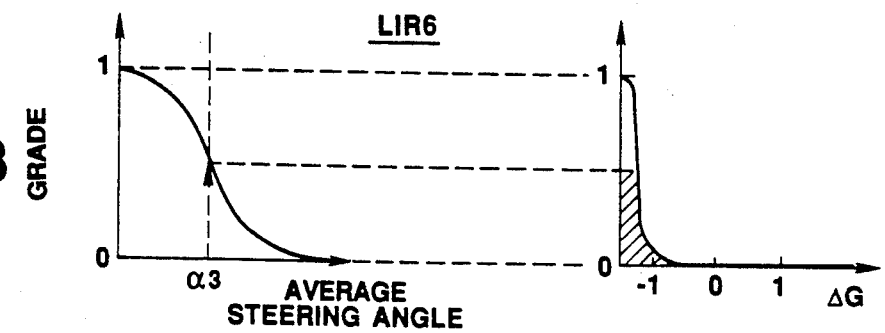
Figure 5C:
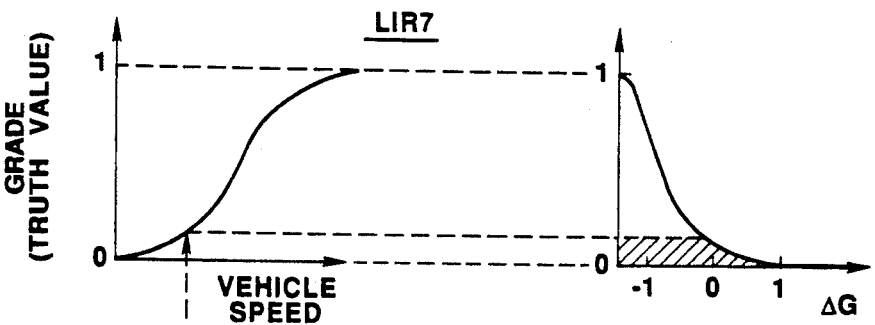
Figure 5D:
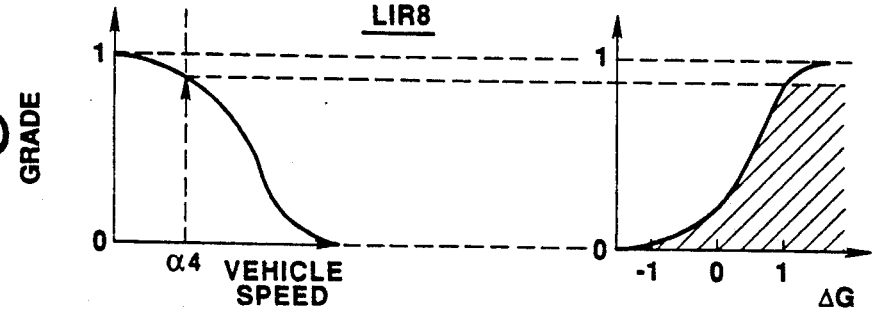

FIG. 1 schematically shows, as an example, an arrangement of various means employed in illustrated embodiment of the present invention. In the example shown in FIG. 1, the vehicle control system for a vehicle 100 comprises an input means 101, an actuator means 102, a means 103 for determining a driver's age, a sensor group 104, and a controlling means which, in this example, comprises a controller means 105a and an adjusting means 105b. The vehicle 100 of this example comprises a steering system 100a, an engine system 100b and a brake system 100c. One of the systems 100a, 100b and 100c is a controlled system controlled by this control system. The input means of this example comprises one of steering wheel, brake pedal and accelerator pedal, and the actuator means 102 of this example comprises a corresponding one of steering actuator, a brake actuator, and accelerating actuator (or throttle actuator). The actuator may be mechanical, hydraulic, electric, or of any other type.

The controller means 105a is a means for determining a response characteristic (or control characteristic or transfer function) between a response produced by the actuator means, and an input produced by the input means 101. The response characteristic may be determined entirely by an electronic (or electric) means or may be determined cooperatively by a mechanical means and the electronic means. In the former case, the actuator means 102 is connected with the input means 101 only by the electric means. In the latter case, the actuator means 102 is connected with the input means 101 by the mechanical (or hydraulic) means. For example, the mechanical means of the controller means includes a steering gear, and the actuator means comprises steering arms of front wheels, and a steering actuator for steering the front wheels in response to an electric control signal produced by the electronic controller means. In this case, the actual front wheel steer angle is controlled to be equal to an algebraic sum of a basic steer angle mechanically determined from the steering wheel angle by the steering gear and an auxiliary steer angle electronically determined by the electronic means. Another example is a brake system in which the brake actuator is connected with the brake pedal by a hydraulic circuit which is controlled by an electronic controller means for determining a response characteristic between the action of the brake actuator and the operation of the brake pedal. It is possible to regard the input means 101, the mechanical controller means and the actuator means 102 as components of a controlled chassis system which is one of the steering system 100a, the engine system 100b and the brake system 100c.

The age determining means 103 is a means for permitting a driver to enter his age to the control system. The sensor group 104 comprises various sensors for sensing operating conditions of the vehicle required to estimate a driver's operating characteristic.

The adjusting means 105b of the controlling means is a means for adjusting the response characteristic of the controller means 105a so as to adapt it to each individual driver. The adjusting means 105b of the example shown in FIG. 1 comprises first, second, third and fourth processing means. The first means determines a basic value of a parameter for determining a specific form of the response characteristic, in accordance with the driver's age. The second means is a means for preparing various input variable from the sensor signals supplied from the sensor group 104. The third means is a means which receives the input variables from the second means, and which performs a fuzzy inference to estimate the driver's characteristic by using the input variables. The third means determines a compensation factor (or a compensation quantity) by estimating the driver's characteristic. The fourth means determines a final value of the parameter by using the basic value determined by the first means and the compensation factor determined by the third means. The parameter appearing in the transfer function of the controller means 105a is made equal to the final value determined by the adjusting means 105b.

A first embodiment of the present invention is shown in FIGS. 2-7.

As shown in FIG. 2, the control system according to the first embodiment is a steering control system for controlling a steer angle of a motor vehicle. The steering control system comprises an input element in the form of a steering wheel 1, a steering mechanism which comprises a steering gear 2, and an actuator (or final controlling element) 3 for steering a pair of steerable wheels 4L and 4R of the vehicle through the steering gear 2. The steering actuator 3 may be an electric motor or may be a hydraulic actuator. In the first embodiment, the input means 101 comprises the steering wheel 1, and the actuator means 102 comprises the steering actuator 3.

The steering control system of this embodiment further comprises a controlling system serving as the controlling means, and a sensor group including one or more sensors. The controlling system of the first embodiment comprises a steering controller section 6 corresponding to the controller means 105a, and a driver's characteristic estimator section 7 corresponding to the adjusting means 105b. The controlling system may be a digital computer system.

The steering controller section 6 receives a steering angle (or steering input) $\theta$ of the steering wheel 1 as an input signal, and produces a steering control signal, as an output signal, according to a transfer function which is a control characteristic of this embodiment. A first sensor of the sensor group of the first embodiment is a steering angle sensor 5 for sensing the steering wheel angle $\theta$ of the steering wheel 1, and producing a steering angle signal representing the sensed steering angle $\theta$. The steering controller section 6 of this embodiment receives the steering angle signal from the steering angle sensor 5, and produces the control signal from the steering angle signal according to the controller transfer function which includes at least one adjustable parameter.

The steering control system of the first embodiment further comprises a card reader 8 which serves as the age determining means 103. The card reader 8 has a slot into which a driver of the vehicle can insert an IC card 8a. The IC card is a portable storage device in which data for determining a driver's age can be stored, and the card reader 8 is a device for obtaining the stored data from the IC card.

The sensor group of the first embodiment further comprises a vehicle speed sensor 9 for sensing a vehicle speed V of the vehicle and producing a vehicle speed signal representing the sensed vehicle speed V, and an engine condition sensor 10 for sensing an operating condition of an engine system of the vehicle. The engine system of the vehicle comprises an engine of the vehicle and an accelerating system for the engine. In this embodiment, the engine condition sensor 10 is an accelerator position sensor for sensing an accelerator opening (degree) A of the vehicle and producing an accelerator opening signal representing the sensed accelerator opening A. The accelerator position sensor 10 is arranged to sense the position of a movable element, such as a throttle valve or an accelerator pedal, of the accelerating system to determine the accelerator opening A (or throttle opening). In this embodiment, the accelerator position sensor 10 senses the position of the accelerator pedal of the vehicle, and the accelerator opening A is an accelerator depression degree. Alternatively, the engine condition sensor 10 may be arranged to sense a power output of the engine.

The driver's characteristic estimator section 7 is connected with the steering angle sensor 5, the card reader 8, the vehicle speed sensor 9, the accelerator position sensor 10 and a manual compensator 11. The estimator section 7 receives the signals from these components 5, 8, 9, 10 and 11, and determines a value of the parameter appearing in the transfer function of the controller section 6.

The controller section 6 of the first embodiment employs the controller transfer function which is expressed as; $\theta \cdot K_D(1+sT_D)$ where s is a differential operator, and $K_D$ and $T_D$ are both parameters (or coefficients). In this embodiment, the values of the first and second parameters $K_D$ and $T_D$ both determined by the driver's characteristic estimator section 7. The controller section 6 determines a desired wheel steer angle $\delta$ which is equal to $\theta \cdot K_D(1+sT_D)$, and produces the control signal representing the desired steer angle $\delta$. The controller section 6 of this embodiment functions as a PD controller implementing a proportional-plus-derivative control action. The steering actuator 3 acts to make the actual steer angle of the wheels 4L and 4R equal to the desired steer angle $\delta$.

As seen from the above mathematical expression, the first parameter $K_D$ relates to a gain of the steering system, and the second parameter $T_D$ relates to a phase of the steering system. The control system can increase the gain by increasing the first parameter $K_D$ beyond one, and advance the phase in the phase lead direction by increasing the second parameter $T_D$ beyond zero. The first parameter $K_D$ is a parameter determining the gain, and the second parameter $T_D$ is a parameter determining the phase. The driver's characteristic estimator section 7 determines values of the first and second parameters $K_D$ and $T_D$ so as to compensate for deterioration of the steering characteristic of a human driver due to the driver's age and individual ability.

The driver's characteristic estimator section 7 determines values of the parameters $K_D$ and $T_D$ by performing a control program shown in FIG. 3.

At a step S31, the estimator section 7 reads the driver's age among various information items on the driver which are obtained from the IC card through the card reader 8.

At a step S32, the estimator section 7 determines basic (or standard) values of the first and second parameters (or coefficients) $K_D$ and $T_D$ corresponding to the driver's age. In this embodiment, the estimator section 7 obtains the value of each parameter corresponding to the driver's age from the following table (or map) 1.

TABLE 1

| AGE | 30's | 40's | 50's | 60's | 70's | 80's |
|---|---|---|---|---|---|---|
| $K_D$ | 1 | 1 | 1 | 1.5 | 2.0 | 2.5 |
| $T_D$ | 0 | 0 | 0 | 0.1 | 0.5 | 0.7 |

Figure 20:
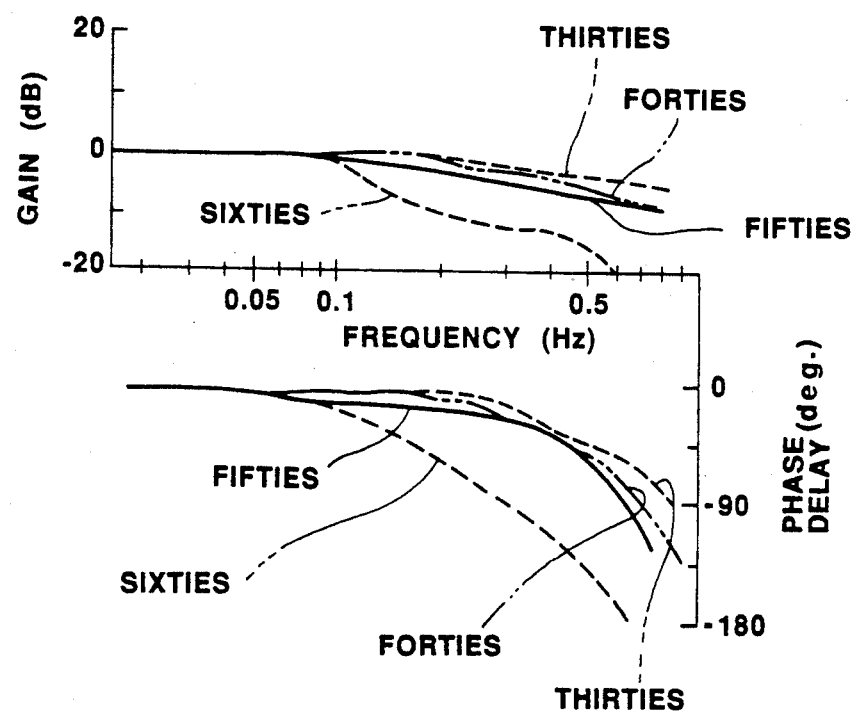
FIG. 20 is a graph showing operating characteristics of human operators of various ages.

The values in this table are so chosen as to compensate for deterioration of the handling characteristics of average drivers (as shown in FIG. 20). The estimator section 7 of this embodiment sets the gain determining first parameter $K_D$ equal to 1, and the phase determining second parameter $T_D$ equal to zero when the age of the driver is less than 60. In this case, the estimator section 7 refrains from compensation of the gain and phase. In this embodiment, $K_D=1.5$ and $T_D=0.1$ when the driver is a sexagenarian; $K_D=2.0$ and $T_D=0.5$ when the driver is a septuagenarian; and $K_D=2.5$ and $T_D=0.7$ when the driver is an octogenarian. In this way, the estimator section 7 increases $K_D$ to increase the gain and increases $T_D$ to advance the phase when the driver is not young. The step S32 corresponds to the first processing means of the adjusting means 105b.

At a step S33, the estimator section 7 reads the steering angle $\theta$, the vehicle speed V and the accelerator opening A. Then, at a step S34, the estimator section 7 estimates a driver's steering characteristic from $\theta$, V and A by performing a fuzzy inference. At a step S35, the estimator section 7 checks the number of repetitions of the steps S33 and S34. For example, the estimator section 7 uses a counter for counting the number of repetitions. Thus, the steps S33 and S34 are repeated until sufficient data items are collected to determine $K_D$ and $T_D$. The estimator section 7 of this embodiment performs the following fuzzy inference procedure (called a center of gravity method).

The estimator section 7 first calculates moving averages and variances in a unit time, of the steering angle $\theta$, the vehicle speed V and the accelerator opening A. This operation corresponds to the second processing means of the adjusting means 105b. Then, the estimator section 7 estimates the driver's steering characteristic by using the following fuzzy linguistic inference rules LIR-1–LIR8 and corresponding membership functions shown in FIGS. 4A–5B. This process corresponds to the third means of the adjusting means 105b.

LIR1 . . . If the steering speed is high; . . . then decrease a phase compensation quantity $\Delta P$. The necessity of the phase compensation is low for an active driver who tends to operate the steering wheel speedily, so that his or her phase delay can be regarded to be small.

LIR2 . . . If the steering speed is low; . . . then increase the phase compensation quantity $\Delta P$.

LIR3 . . . If an average accelerator speed is high; . . . then decrease the phase compensation quantity $\Delta P$. An active driver tends to operate the accelerator pedal speedily with no or little phase delay.

LIR4 . . . If the average accelerator speed is low; . . . then increase the phase compensation quantity $\Delta P$.

LIR5 . . . If an average steering angle is large; . . . then increase a gain compensation quantity $\Delta G$. The fourth and fifth rules LIR4 and LIR5 are intended to improve the steering response of the vehicle.

LIR6 . . . If the average steering angle is small; . . . then decrease the gain compensation quantity $\Delta G$.

LIR7 . . . If the vehicle speed is high; . . . then decrease the gain compensation quantity $\Delta G$. This is to improve the safety and control of the vehicle.

LIR8... If the vehicle speed is low; ... then increase the gain compensation quantity $\Delta G$.

In this embodiment, the average accelerator speed is the average of values of the time rate of change of the accelerator opening degree A, and the steering speed is the time rate of change of the steering angle.

When, for example, the steering speed is equal to $\alpha 1$, the average accelerator speed is equal to $\alpha 2$, the average steering angle is equal to $\alpha 3$, and the vehicle speed is equal to $\alpha 4$, then we can determine plane figures shown by hatching in FIGS. 4A through 4D, and figures shown by hatching in FIGS. 5A through 5D. The hatched figures relating to the phase compensation quantity $\Delta P$ shown in FIGS. 4A through 4D are collected in FIG. 6, and the figures relating to the gain compensation quantity $\Delta G$ shown in FIGS. 5A through 5D are collected in FIG. 7.

Figure 6:
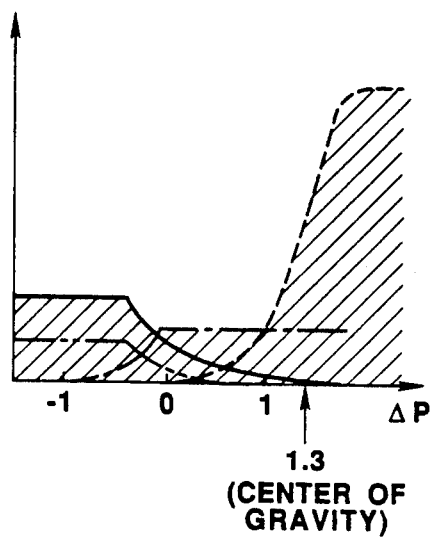
FIGS. 6 and 7 are graphs showing collections of plane figures determined by the membership functions of FIGS. 4A-5D.
Figure 7:
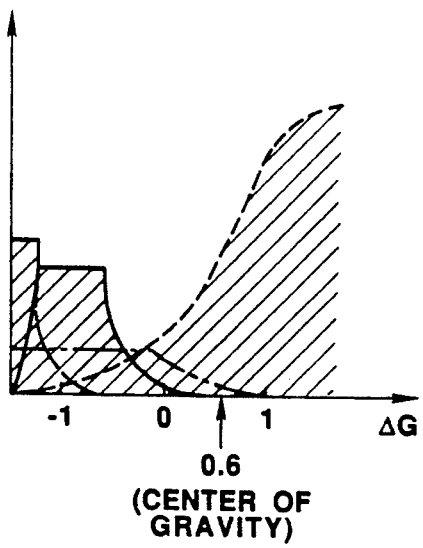

When data items have been collected sufficiently to determine $K_D$ and $T_D$, then the estimator section 7 determines the center of gravity of the figures collected in FIG. 6, and the center of gravity of the figures collected in FIG. 7. In this example, the abscissa of the center of gravity shown in FIG. 6 is equal to 1.3, and the abscissa of the center of gravity shown in FIG. 7 is equal to 0.6. At a step S36, the estimator section 7 determines adjusted final values of $K_D$ and $T_D$ by using the coordinates of the centers of gravity. In this example, the adjusted value of $K_D$ is set equal to a product obtained by multiplying the basic value of $K_D$ obtained from the table 1, by 1+1.3. The adjusted value of $T_D$ is set equal to a product obtained by multiplying the basic value of $T_D$ obtained from the table 1, by 1+0.6. The estimator section 7 specifies the transfer function of the steering controller 6 by using the adjusted values of $K_D$ and $T_D$, and the controller 6 produces the control signal according to the thus-determined transfer function. In this way, the control system compensates for variation of the driver's handling characteristic due to both of the driver's age and individual feature by adjusting $K_D$ and $T_D$, and enables the driver to control the vehicle satisfactorily. The step S36 corresponds to the fourth means of the adjusting means 105b.

At a step S37, the estimator section 7 determines whether a signal of the manual compensator 11 for commanding a manual compensation is present or not. If it is not, the estimator section 7 terminates the current control cycle. If the command signal of the manual compensator 11 is present, then the estimator section 7 replaces the data item in a corresponding address in the table 1 by a data item supplied from the manual compensator 11. The thus-obtained information about the driver is stored in the IC card 8a.

A second embodiment of the present invention is shown in FIGS. 8-13. The control system according to the second embodiment is a brake control system for a vehicle.

Figure 8:
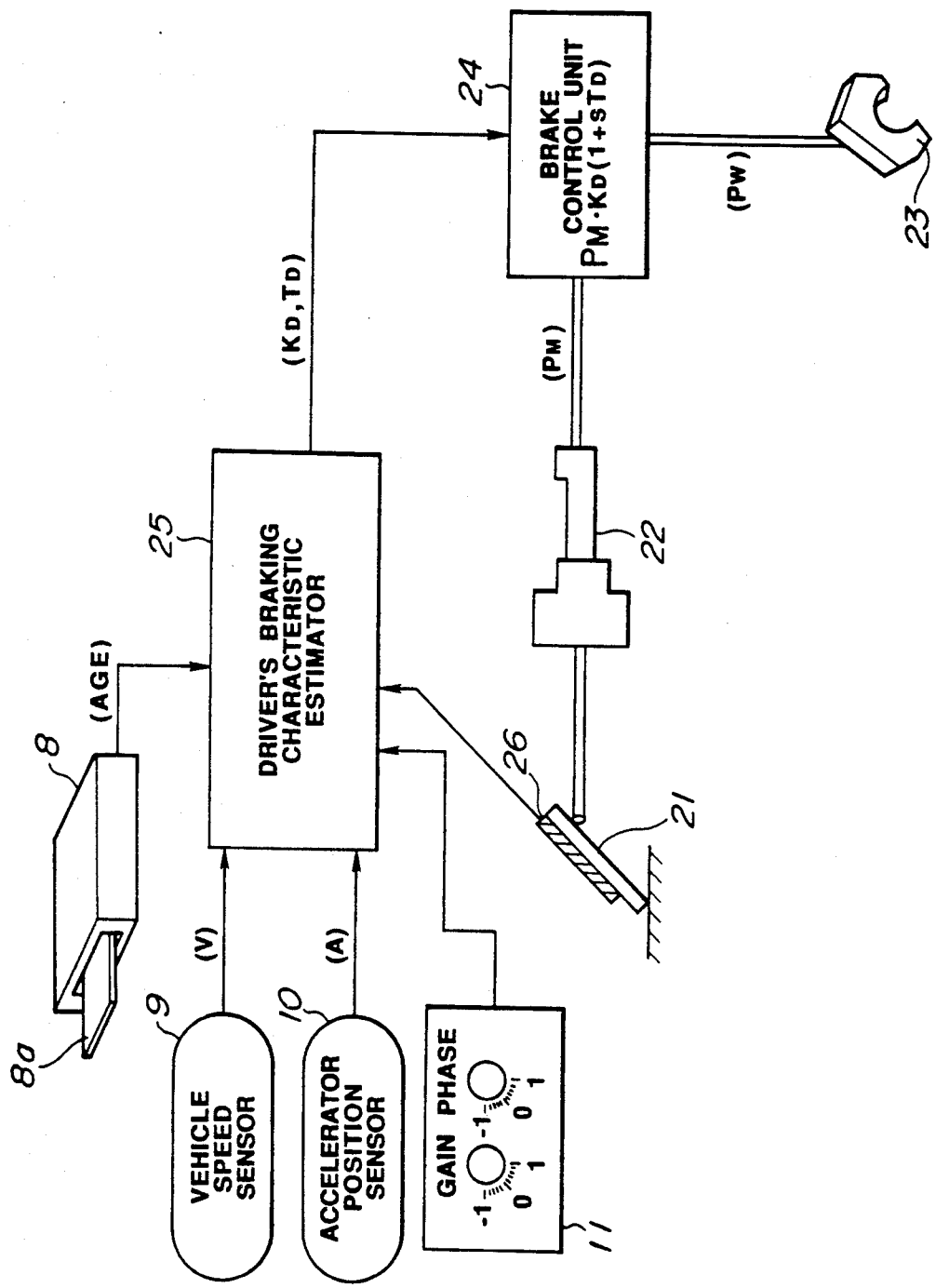
FIG. 8 is a schematic view showing a brake control system according to the second embodiment of the present invention.
Figure 9:
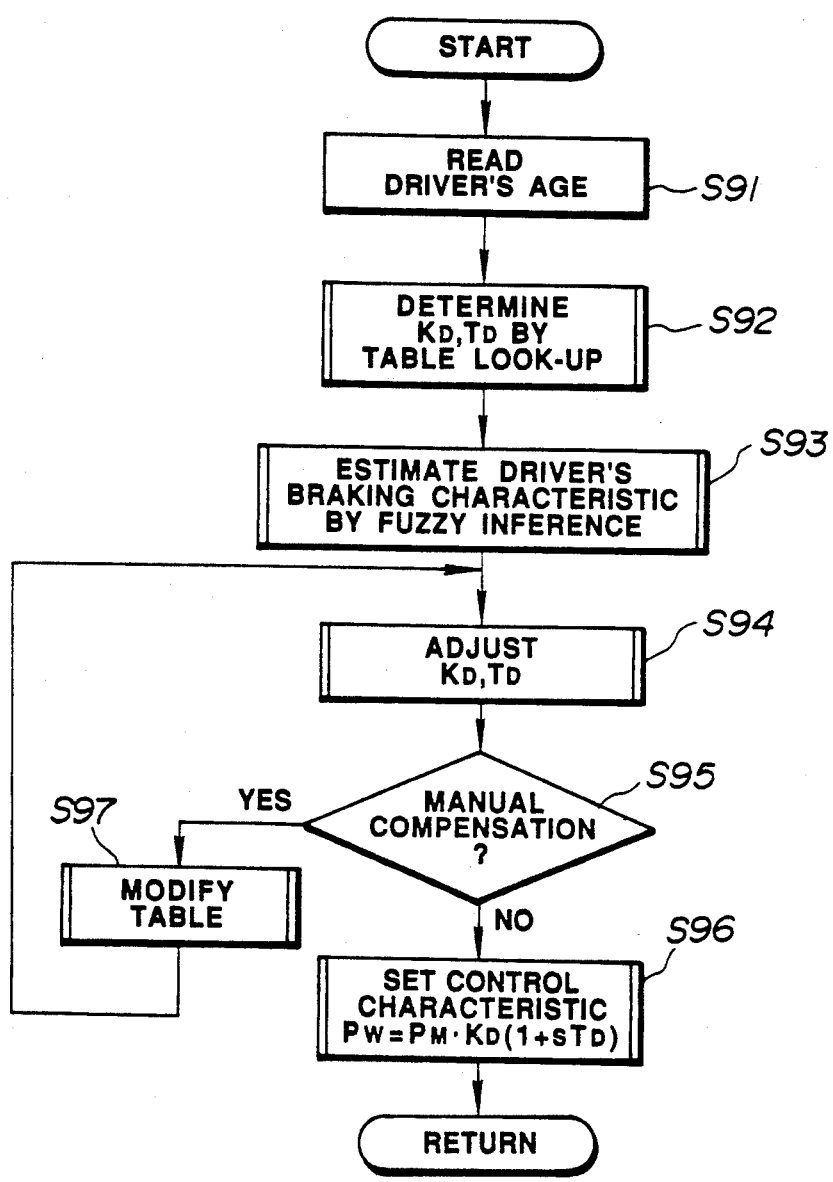
FIG. 9 is a flowchart showing a control program employed in the second embodiment.
Figure 10A:
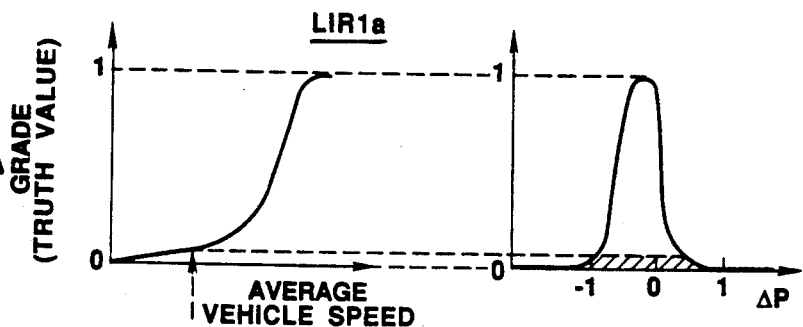
FIGS. 10A through 10D and 11A through 11D are graphs showing membership functions used in a fuzzy inference of the second embodiment.
Figure 10B:
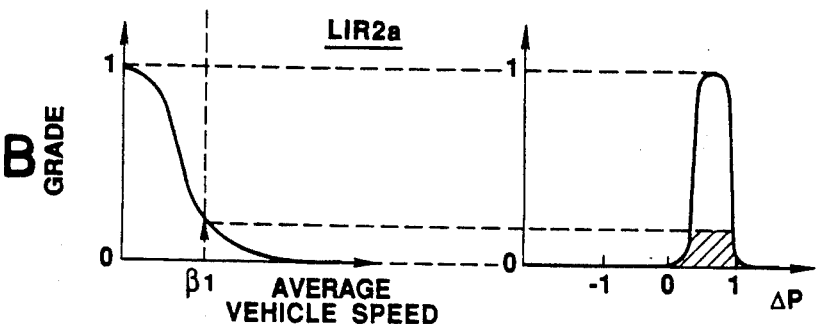
Figure 10C:
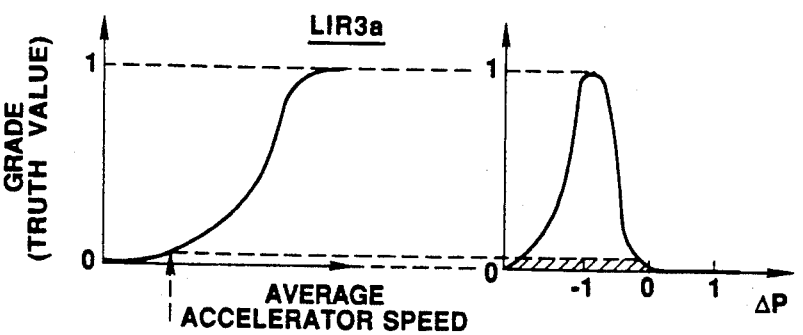
Figure 10D:
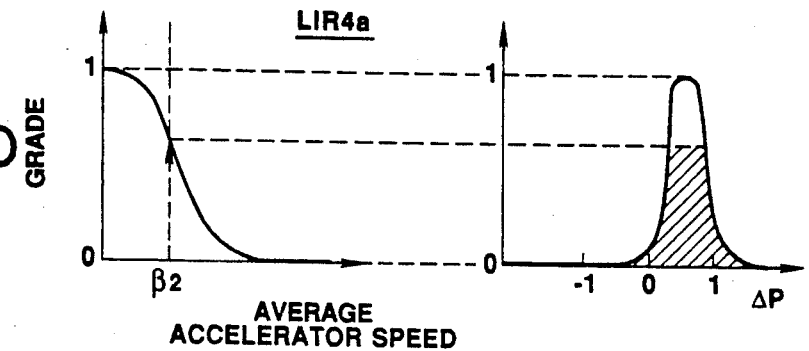
Figure 11A:
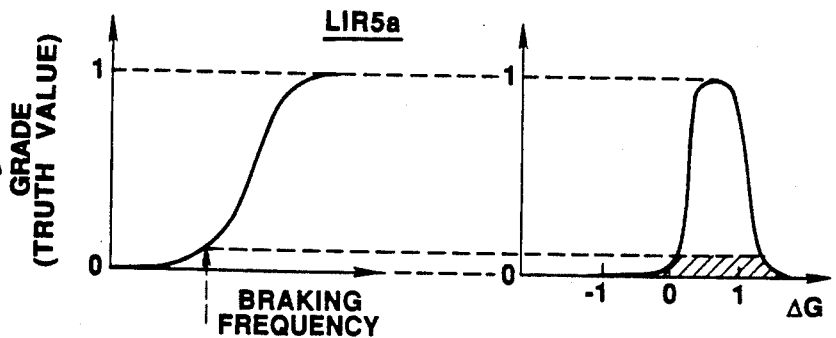
Figure 11B:
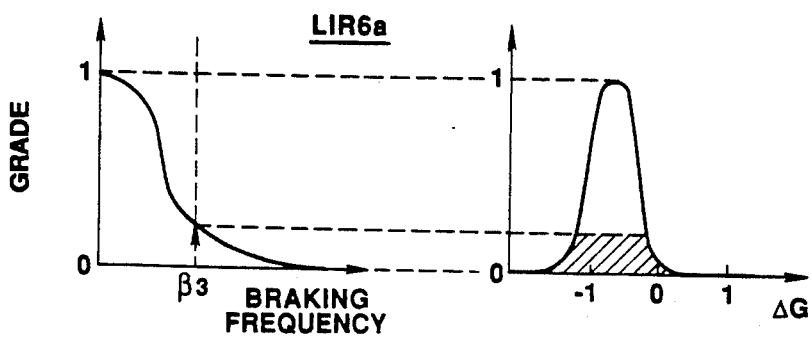
Figure 11C:
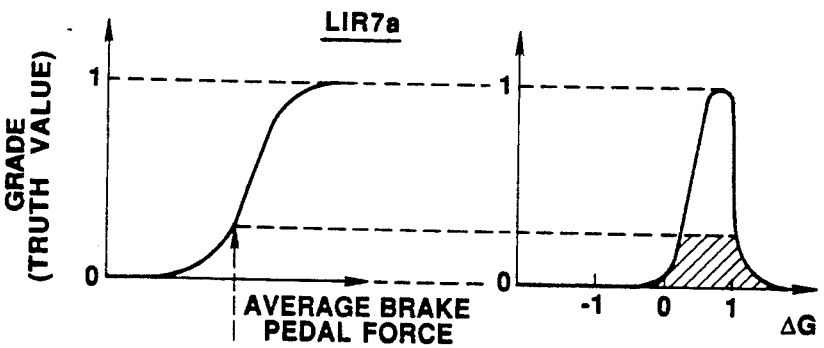
Figure 11D:
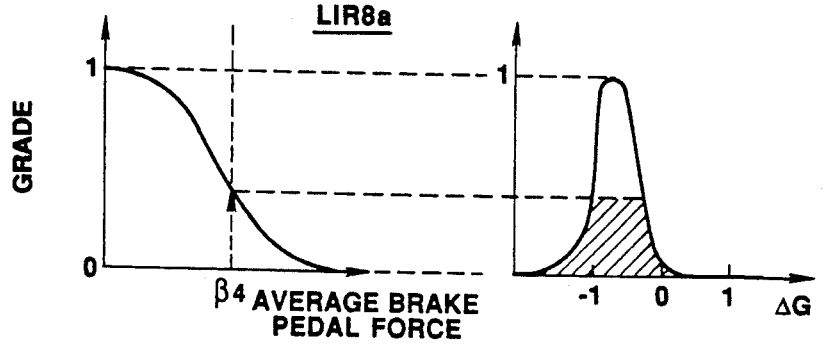

As shown in FIG. 8, the brake control system of this embodiment comprises an input element in the form of a brake pedal 21, a master cylinder 22, and at least one brake actuator in the form of a wheel cylinder 23 for applying a braking force on an associated road wheel of the vehicle. The master cylinder 22 is a primary unit for producing a master cylinder fluid pressure $P_M$ in accordance with a force (braking input) applied by the driver on the brake pedal 21. The master cylinder pressure $P_M$ is delivered to a brake force control unit 24. The brake force control unit 24 produces a brake fluid pressure $P_W$ in accordance with the master cylinder pressure $P_M$, and delivers the brake pressure $P_W$ to the wheel cylinder 23. Normally, the brake fluid pressure $P_W$ is not equal to the master cylinder pressure $P_M$. The control unit 24 of this embodiment makes the brake pressure $P_W$ equal to the master cylinder pressure $P_M$ to ensure the safety of the vehicle when a failure is detected in the brake control system. Normally, the brake force control unit 24 determines the brake pressure $P_W$ from the master cylinder pressure $P_M$ according to an adjustable transfer function (control characteristic).

The control unit 24 of this embodiment has its own pressure source (not shown), and arranged to regulate the fluid pressure of the pressure source to produce the brake pressure $P_W$ which is equal to $P_M \cdot K_D(1+sT_D)$. In this mathematical expression, s is a differential operator (or an operator used in Laplace transformation). The thus-produced brake pressure $P_W$ is supplied to the wheel cylinder 23.

The brake control system of the second embodiment further comprises a driver's braking characteristic estimator section 25 which is connected with a brake sensor 26. The estimator section 25 is further connected with a card reader 8, a vehicle speed sensor 9, an accelerator position sensor 10 and a manual compensator 11 which are similar, respectively, to the components 8, 9, 10 and 11 of the first embodiment shown in FIG. 2. The brake sensor 26 is constructed to sense an operating condition of the brake system of the vehicle. The brake sensor 26 of this embodiment is attached to the brake pedal 21, and arranged to sense a condition of the brake pedal 21. The estimator section 25 receives the signals from these components 8-11 and 26, and adjusts the first and second parameters $K_D$ and $T_D$ of the controller transfer function to compensate for variation of the driver's characteristic of braking operation due to the driver's age and individual feature, by performing a control procedure shown in FIG. 9. The estimator section 25 determines the adjusted values of $K_D$ and $T_D$, and supplies the adjusted final values to the brake control unit 24.

At a step S91, the estimator section 25 reads the driver's age among various information items on the driver which are obtained from the IC memory card 8a through the card reader 8. At a step S92, the estimator section 25 determines basic (or standard) values of the first and second parameters (or coefficients) $K_D$ and $T_D$ corresponding to the driver's age. The estimator section 25 of this embodiment obtains the basic value of each parameter $K_D$ or $T_D$ from the following table 2.

TABLE 2

| AGE | 30's | 40's | 50's | 60's | 70's | 80's |
|---|---|---|---|---|---|---|
| $K_D$ | 1 | 1 | 1 | 1.1 | 1.2 | 1.5 |
| $T_D$ | 0 | 0 | 0 | 0.1 | 0.5 | 0.8 |

The values in this table are so chosen as to compensate for deterioration of the ability of an average driver. When the driver's age is less than 60, no compensation is made both in gain and phase ($K_D=1$, $T_D=0$). When the age is equal to or higher than 60, the estimator section 25 increases the gain and shifts the phase in the leading direction. In this example, $K_D 1.1$ and $T_D=0.1$ when the driver is 60 or more and less than 70 years old, and $K_D=1.2$ and $T_D=0.5$ when the driver is 70 or more and less than 80 years old. When the driver's age is between 80 and 90, $K_D=1.5$ and $T_D=0.8$.

Then, at a step S93, the estimator section 25 estimates the driver's braking characteristic to adapt the controller transfer function to each individual driver. In this embodiment, the estimator section 25 performs the following fuzzy inference by using the output signals of the brake sensor 26, the vehicle speed sensor 9 and the accelerator position sensor 10.

First, the estimator section 25 calculates moving averages and variances within the unit time length, of the brake sensor output, the vehicle speed V, and the accelerator opening A. By using the sensor outputs, the estimator section 25 of this embodiment further calculates a braking frequency and other variables required for the fuzzy inference. The estimator section 25 of the second embodiment uses the following fuzzy linguistic inference rules LIR1a–LIR8a and corresponding membership functions shown in FIGS. 20A–11D.

LIR1a. . . If the average vehicle speed is high; . . . then decrease a phase compensation quantity $\Delta P$.

LIR2a . . . If the average vehicle speed is low; . . . then increase the phase compensation quantity $\Delta P$.

LIR3a . . . If the average accelerator speed is high; . . . then decrease the phase compensation quantity $\Delta P$.

LIR4a . . . If the average accelerator speed is low; . . . then increase the phase compensation quantity $\Delta P$.

LIR5a . . . If the braking frequency is high; . . . then increase a gain compensation quantity $\Delta G$.

LIR6a . . . If the braking frequency is low; . . . then decrease the gain compensation quantity $\Delta G$.

LIR7a . . . If the moving average of the brake pedal force is high; . . . then increase the gain compensation quantity $\Delta G$.

LIR8a . . . If the moving average of the brake pedal force is low; . . . then decrease the gain compensation quantity $\Delta G$.

In this embodiment, the average accelerator speed is the average of values of the time rate of change of the accelerator opening degree A, and the braking frequency is the number of times the driver's braking operation occurs within a specified time interval. In general, the average vehicle speed is high when the driver's phase delay is small. An unskilled driver tends to depress the brake pedal frequently, so that the braking frequency is high. A skilled driver operates the accelerator pedal rapidly and does not want too much compensation.

When, for example, the average vehicle speed is equal to $\beta 1$, the average accelerator speed is equal to $\beta 2$, the braking frequency is equal to $\beta 3$, and the moving average of the brake pedal force is equal to $\beta 4$, then we can determine plane figures shown by hatching in FIGS. 10A through 10D, and plane figures shown by hatching in FIGS. 11A through 11D. The hatched figures relating to the phase compensation quantity $\Delta P$ shown in FIGS. 10A through 10D are collected in FIG. 12, and the figures relating to the gain compensation quantity $\Delta G$ shown in FIGS. 11A through 11D are collected in FIG. 13.

Figure 12:
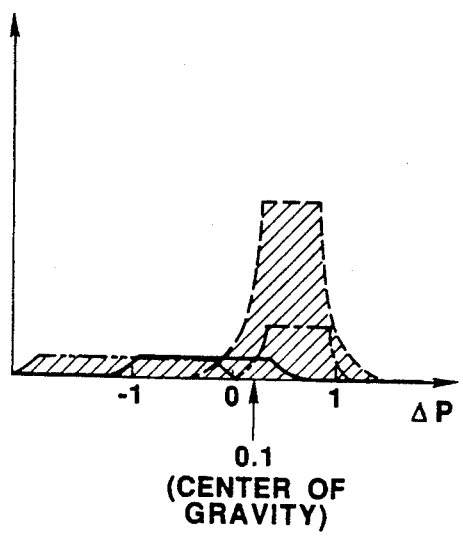
FIGS. 12 and 13 are graphs showing collection of plane figures determined by the membership functions of FIGS. 10A-11D.
Figure 13:
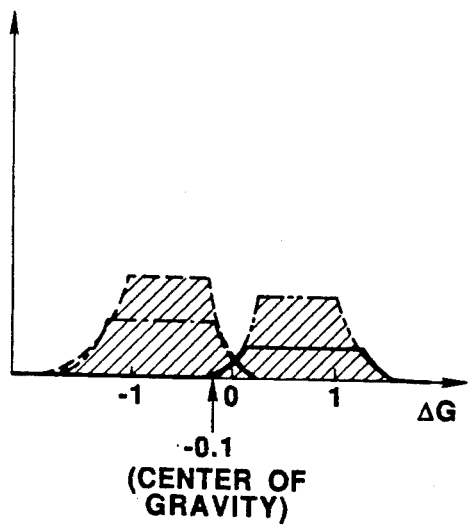

Then, the estimator section 25 determines the center of gravity of the figures collected in FIG. 12, and the center of gravity of the figures collected in FIG. 13. In this example, the abscissa of the center of gravity shown in FIG. 12 is equal to 0.1, and the abscissa of the center of gravity shown in FIG. 13 is equal to −0.1. At a step S94, the estimator section 25 determines adjusted values of $K_D$ and $T_D$ by using the coordinates of the centers of gravity. In this example, the adjusted value of $K_D$ is set equal to a product obtained by multiplying the basic value of $K_D$ obtained from the table 2, by $1+0.1$. The adjusted value of $T_D$ is set equal to a product obtained by multiplying the basic value of $T_D$ obtained from the table 2, by $1-0.1$. The estimator section 25 specifies the transfer function of the brake force control unit 24 by using the adjusted values of $K_D$ and $T_D$, and the control unit 24 produces the brake fluid pressure according to the thus-determined transfer function. In this way, the control system compensates for variation of the driver's characteristic due to both of the driver's age and individual feature by adjusting $K_D$ and $T_D$ and enables the driver to control the vehicle satisfactorily. In this embodiment, the estimator section 25 makes up a data table for future use by substituting the adjusted values of $K_D$ and $T_D$ for the contents of the corresponding memory locations for the table 2.

At a step S95, the estimator section 25 determines whether a signal of the manual compensator 11 for commanding a manual compensation is present or not. If it is not, the estimator section 25 terminates the current control cycle. If the command signal of the manual compensator 11 is present, then the estimator section 25 replaces the data item of a corresponding address in the table 2 by a data item supplied from the manual compensator 11. The thus-obtained information about the driver is stored in the IC card 8a.

The brake sensor 26 of the second embodiment is arranged to sense the brake pedal force. However, it is optional to employ either or both of such a sensor for sensing the brake pedal force, and a sensor for sensing the position of the brake pedal.

A third embodiment of the present invention is shown in FIGS. 14–19. The control system according to the third embodiment is an accelerator control system for a vehicle.

Figure 14:
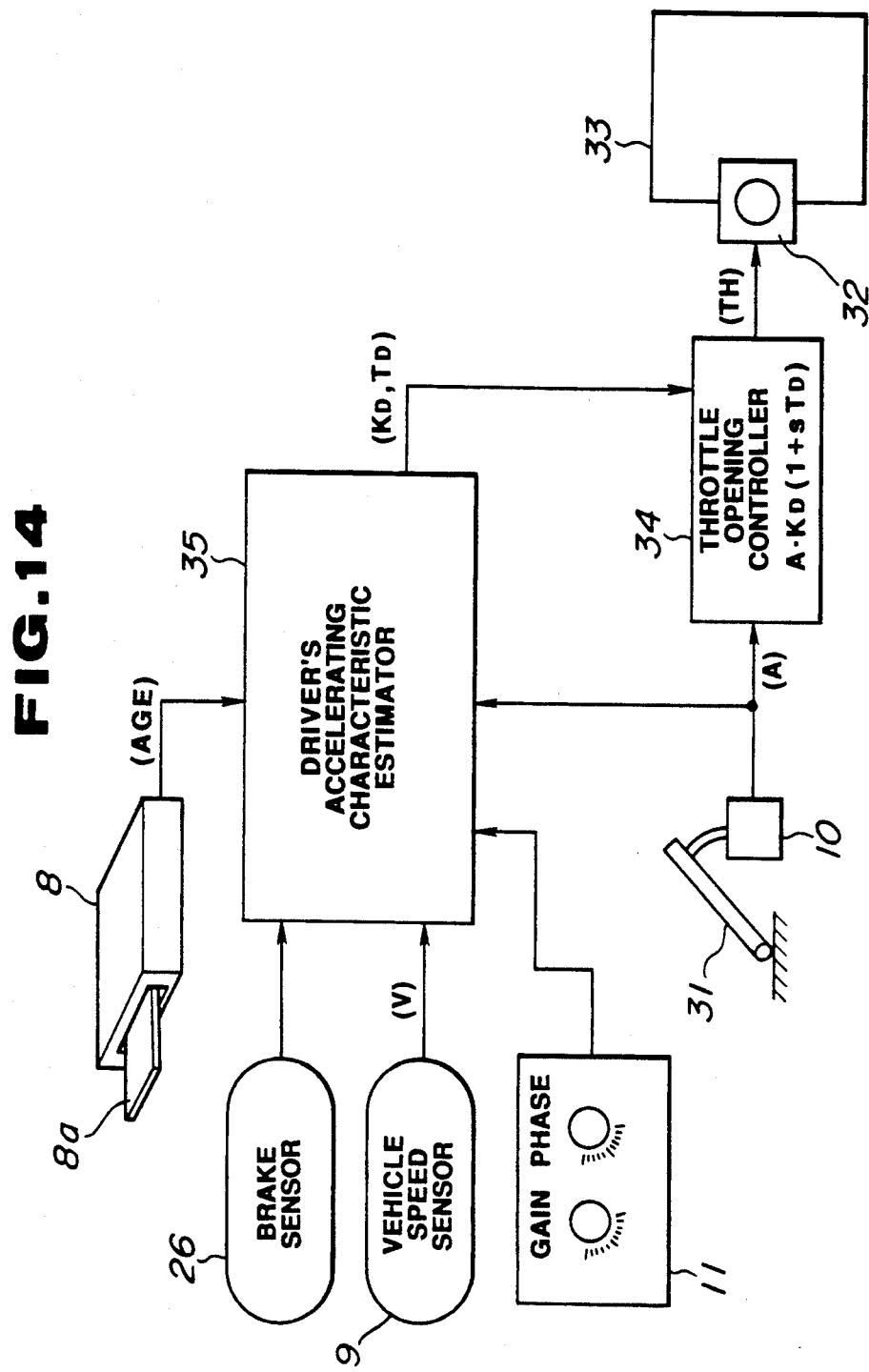
FIG. 14 is a schematic view showing an accelerator control system according to the third embodiment of the present invention.
Figure 16A:
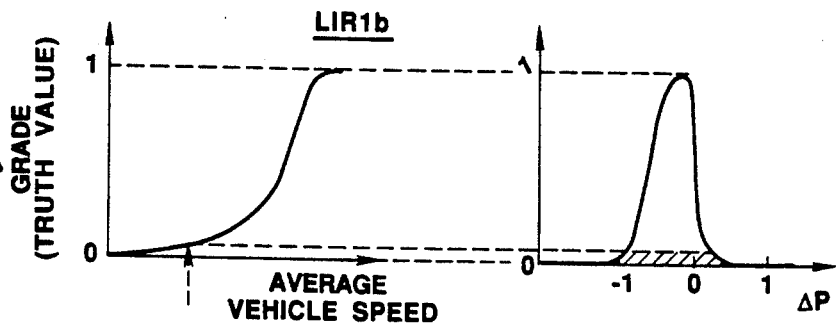
FIGS. 16A through 16D and 17A through 17D are graphs showing membership functions used in a fuzzy inference of the third embodiment.
Figure 16B:
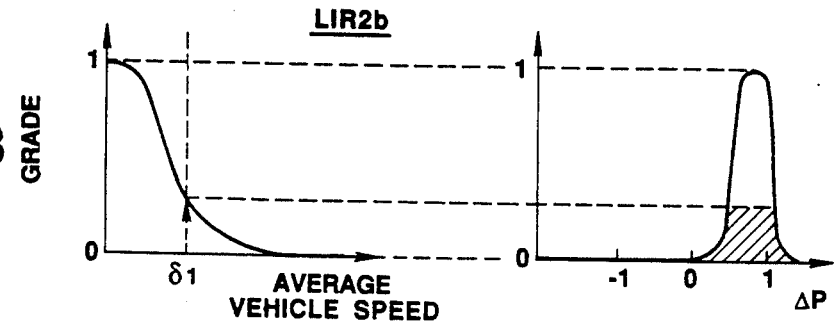
Figure 16C:
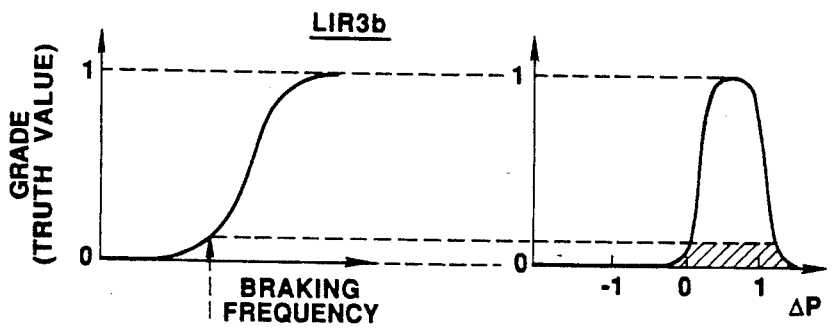
Figure 16D:
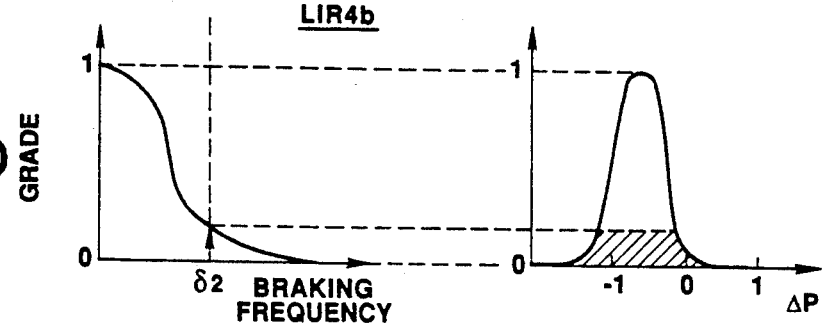
Figure 17A:
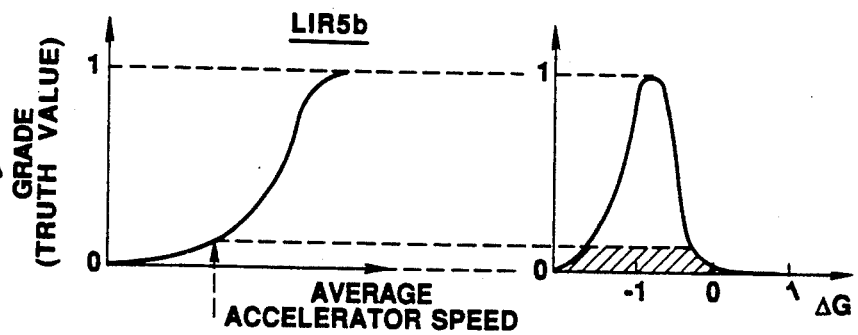
Figure 17B:
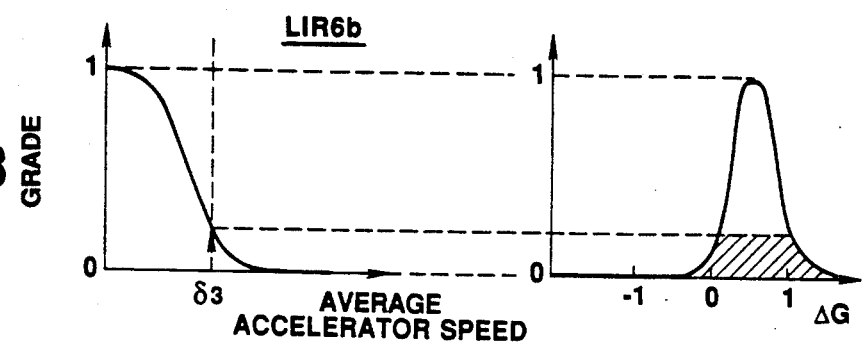
Figure 17C:
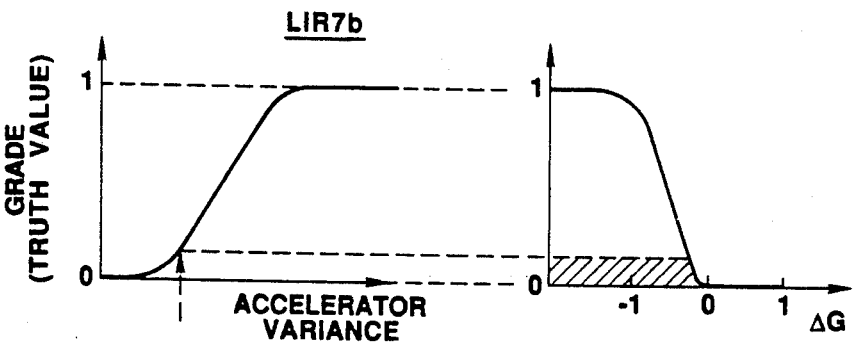
Figure 17D:
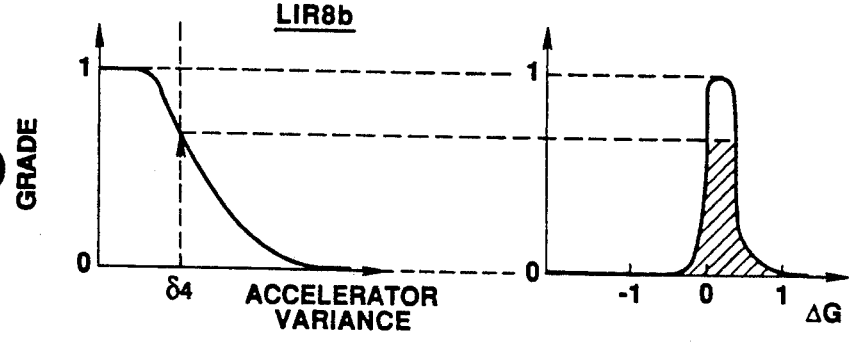

As shown in FIG. 14, the accelerator control system of the third embodiment comprises an input element in the form of an accelrator pedal 31, a throttle actuator 32 and a throttle opening controller 34. The throttle actuator 32 varies an opening (degree) TH of a throttle valve (not shown) which varies the power output of an engine of the vehicle by varying the amount of air entering the engine 33. The throttle opening controller 34 controls the throttle opening TH by sending a control signal to the throttle actuator 32. The controller 34 determines the throttle opening TH from a accelerator depression degree (or accelerator opening A) of the accelerator pedal 31 according to an adjustable transfer function (or control characteristic). In this embodiment, the throttle opening TH is not always proportional to the accelerator opening A.

The throttle opening controller 34 is connected with an accelerator position sensor 10 which, in the third embodiment, is arranged to sense the depression degree A of the accelerator pedal 31. The throttle opening controller 34 receives an accelerator opening signal representing the accelerator opening A sensed by the sensor 10, and produces a throttle control signal representing a desired throttle opening. In response to this control signal, the throttle actuator 32 makes the actual throttle opening of the throttle valve equal to the desired throttle opening. In this embodiment, the throttle opening controller 34 determines the throttle opening TH according to the following transfer function: $TH = A \cdot K_D(1 + sT_D)$. The first and second parameters KD and TD are determined by a driver's accelerating characteristic estimator section 35.

The estimator section 35 of the third embodiment is connected with the card reader 8, the vehicle speed sensor 9, the accelerator position sensor 10, the manual compensator 11 and the brake sensor 26. The estimator section 35 receives signals from these components 8-11 and 26, and determines values of $K_D$ and $T_D$ by performing a control program shown in FIG. 15.

At a step S151, the estimator section 35 reads the driver's age obtained from the IC card 8a. At a step S152, the estimator section 35 determines basic values of the first and second parameters $K_D$ and $T_D$ by using the following table 3.

TABLE 3

| AGE | 30's | 40's | 50's | 60's | 70's | 80's |
|---|---|---|---|---|---|---|
| $K_D$ | 1 | 1 | 1 | 1.1 | 1.1 | 1.5 |
| $T_D$ | 0 | 0 | 0 | 0.1 | 0.8 | 0.8 |

The values in this table are so chosen as to compensate for deterioration of the ability of an average driver. When the driver's age is less than 60, no compensation is made both in gain and phase ($K_D=1$, and $T_D=0$). When the age is equal to or higher than 60, the estimator section 35 increases the gain and shifts the phase in the leading direction.

Then, at a step S153, the estimator section 35 estimates the driver's accelerating characteristic to adapt the controller transfer function to each individual driver. In this embodiment, the estimator section 35 performs the following fuzzy inference by using the output signals of the brake sensor 26, the vehicle speed sensor 9 and the accelerator position sensor 10.

First, the estimator section 35 calculates moving averages and variances within the unit time length, of the brake sensor output, the vehicle speed V, and the accelerator opening A. The estimator section 35 of the third embodiment uses the following fuzzy linguistic inference rules LIR1b-LIR8b and corresponding membership functions shown in FIGS. 16A-17D.

LIR1b . . . If the vehicle speed is high; . . . then decrease a phase compensation quantity $\Delta P$.

LIR2b . . . If the vehicle speed is low; . . . then increase the phase compensation quantity $\Delta P$.

LIR3b . . . If the braking frequency is high; . . . then increase the phase compensation quantity $\Delta P$.

LIR4b . . . If the braking frequency is low; . . . then decrease the phase compensation quantity $\Delta P$.

LIR5b . . . If the average accelerator speed is high; . . . then decrease a gain compensation quanity $\Delta G$.

LIR6b . . . If the average accelerator speed is low; . . . then increase the gain compensation quantity $\Delta G$.

LIR7b . . . If the variance, in a predetermined time interval, of change of the accelerator opening is great; . . . then decrease the gain compensation quantity $\Delta G$.

LIR8b . . . If the variance of change of the accelerator opening is small; . . . then increase the gain compensation quantity $\Delta G$. When the variance of the accelerator opening is too great, then the control system of this embodiment judeges that the driver's control is unstable, and decreases the compensation quantity.

When, for example, the average vehicle speed is equal to $\delta 1$, the braking frequency is equal to $\delta 2$, the average accelerator speed is equal to $\delta 3$, and the variance of the accelerator opening A is equal to $\delta 4$, then we can determine plane figures shown by hatching in FIGS. 16A through 16D, and plane figures shown by hatching in FIGS. 17A through 17D. The hatched figures relating to the phase compensation quantity $\Delta P$ shown in FIGS. 16A through 16D are collected in FIG. 18, and the figures relating to the gain compensation quantity $\Delta G$ shown in FIGS. 17A through 17D are collected in FIG. 19.

Figure 18:
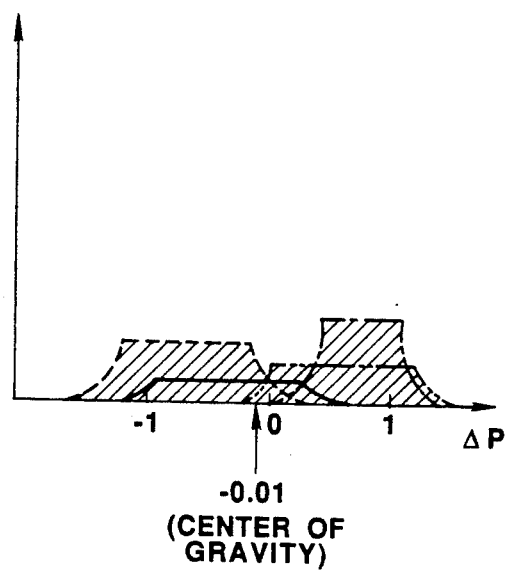
FIGS. 18 and 19 are graphs showing collections of plane figures determined by the membership functions of the third embodiment.
Figure 19:
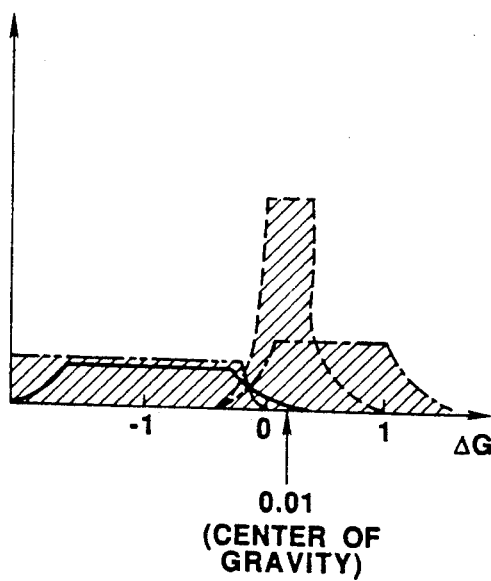

Then, the estimator section 35 determines the center of gravity of the figures collected in FIG. 18, and the center of gravity of the figures collected in FIG. 19. In this example, the abscissa of the center of gravity shown in FIG. 18 is equal to $-0.01$, and the abscissa of the center of gravity shown in FIG. 19 is equal to 0.01. At a step S154, the estimator section 35 determines adjusted values of $K_D$ and $T_D$ by using the coordinates of the centers of gravity. In this example, the adjusted value of $K_D$ is set equal to a product obtained by multiplying the basic value of $K_D$ obtained from the table 3, by $1-0.01$. The adjusted value of $T_D$ is set equal to a product obtained by multiplying the basic value of $T_D$ obtained from the table 3, by $1+0.01$. The estimator section 35 specifies the transfer function of the throttle opening controller 34 by using the adjusted values of $K_D$ and $T_D$, and the controller 34 produces the control signal according to the thus-determined transfer function. In this way, the control system compensates for variation of the driver's characteristic due to both of the driver's age and individual feature by adjusting $K_D$ and $T_D$, and enables the driver to control the vehicle satisfactorily.

At a step S155, the estimator section 35 determines whether a signal of the manual compensator 11 for commanding a manual compensation is present or not. If it is not, the estimator section 35 terminates the current control cycle. If the command signal of the manual compensator 11 is present, then the estimator section 35 replaces the data item in a corresponding address in the table 1 by a data item supplied from the manual compensator 11. The thus obtained information about the driver is stored in the IC card 8a.

What is claimed is:

1. A control system for a vehicle, comprising:
an input means for producing an input signal representing a driver's command in accordance with a driver's operation;
an actuator means for receiving a control signal and varying a manipulated variable to control motion of said vehicle in response to said control signal;
an age determining means for producing an age signal representing a driver's age;
a sensing means for sensing said driver's operation; and
a controlling means for producing said control signal from said input signal according to a predetermined control characteristic, estimating a driver's characteristic from a signal supplied from said sensing means, and adjusting said control characteristic in accordance with said driver's characteristic and said driver's age.

2. A control system according to claim 1 wherein said actuator means comprises an actuator for varying said manipulated variable which is one of a steer angle of a steerable wheel of said vehicle, a brake actuation force of a brake system of said vehicle, and a throttle opening of an engine system of said vehicle.

3. A control system according to claim 2 wherein said age determining means comprises a device for storing a data item representing said driver's age.

4. A control system according to claim 3 wherein said controlling means includes a means for adjusting said control characteristic so as to advance a phase of said control characteristic when said driver's age is higher than a predetermined age.

5. A control system according to claim 4 wherein said input means comprises a first input element which is one of a steering wheel, a brake pedal and an accelerator pedal of said vehicle, said sensing means comprises a first sensor for sensing a condition of said first input element and producing a first sensor signal representing the condition of said first input element, and a second sensor for sensing a condition of a second input element which is one of said steering wheel, brake pedal and accelerator pedal of said vehicle and which is distinct from said first input element, and producing a second sensor signal representing the condition of said second input element, and said controlling means includes a means for estimating a driving ability of the driver from a series of instantaneous values of said first sensor signal obtained at regular time intervals and a series of instantaneous values of said second sensor signal obtained at regular time intervals, and adjust said control characteristic so as to advance the phase of said control characteristic as said driving ability decreases.

6. A control system according to claim 5 wherein said sensing means comprises a third sensor for sensing a vehicle speed of said vehicle, and said controlling means includes a means for decreasing a gain of said control characteristic as said vehicle speed increases.

7. A control system according to claim 6 wherein said controlling means includes a means for estimating said driver's characteristic by performing a fuzzy inference.

8. A control system according to claim 3 wherein said input means comprises a first input element adapted to be moved by the driver to steer said vehicle, said actuator of said actuator means is a steering actuator for actuating a steering system of said vehicle, said sensing means comprises a first sensor for sensing a displacement of said first input element and producing a first sensor signal representing the displacement of said first input element, a second sensor for sensing an operating condition of an engine system of said vehicle and producing a second sensor signal representing the condition of said engine system, and a third sensor for sensing a vehicle speed of said vehicle and producing a third sensor signal representing said vehicle speed, and said controlling means includes a means for determining an average of said first sensor signal, an average of said second sensor signal and an average of said third sensor signal, estimating said driver's characteristic from said averages of said first, second and third sensor signals, and adjusting said control characteristic in accordance with said driver's characteristic and said driver's age.

9. A control system according to claim 8 wherein said first input element is in a form of a steering wheel, said first sensor is a steering angle sensor for sensing a steering wheel angle of said steering wheel and producing a steering angle signal representing said steering wheel angle, and said controlling means comprises a controller means for receiving said steering angle signal and producing said control signal to control said steering actuator from said steering angle signal according to a transfer function which is a relationship between said control signal and said steering angle signal, and an adjusting means for performing a fuzzy inference to estimate said driver's characteristic by using said averages of said first, second and third sensor signals.

10. A control system according to claim 9 wherein said second sensor is an accelerator position sensor for sensing an accelerator depression degree of an accelerator pedal of said vehicle, and said adjusting means comprises a first processing means for determining basic values of a gain determining parameter and a phase determining parameter in accordance with said driver's age, a second processing means for determining an average steering speed which is an average of a series of instantaneous values of a time rate of change of said steering wheel angle, an average steering angle which is an average of a series of instantaneous values of said steering wheel angle, an average accelerator speed which is an average of a series of instantaneous values of a time rate of change of said accelerator depression degree and an average vehicle speed which is an average of a series of instantaneous values of said vehicle speed, a third processing means for storing data specifying first membership functions to decrease a phase compensation factor as said average steering speed increases and to increase said phase compensation factor as said average steering speed decreases, second membership functions to increase a gain compensation factor as said average steering angle increases and to decrease said gain compensation factor as said average steering angle decreases, third membership functions to decrease said gain compensation factor as said average vehicle speed increases and to increase said gain compensation factor as said average vehicle speed decreases, and fourth membership functions to decrease said phase compensation factor as said average accelerator speed increases and to increase said phase compensation factor as said average accelerator speed decreases, and determining said phase compensation factor and said gain compensation factor by the fuzzy inference using said first, second, third and fourth membership functions, and a fourth processing means for determining a final value of said gain parameter by multiplying said basic value of said gain parameter by said gain compensation factor and a final value of said phase parameter by multiplying said basic value of said phase parameter by said phase compensation factor and determining said transfer function of said controller means by said final values of said gain parameter and said phase parameter.

11. A control system according to claim 3 wherein said input means comprises a first input element adapted to be operated by the driver of said vehicle to brake said vehicle, said actuator of said actuator means is a brake actuator for braking said vehicle, said sensing means comprises a first sensor for sensing a braking effort applied by the driver to said first input element and producing a first sensor signal reprsenting said braking effort, a second sensor for sensing an operating condition of an engine system of said vehicle and producing a second sensor signal representing the condition of said engine system, and a third sensor for sensing a vehicle speed of said vehicle and producing a third sensor signal representing said vehicle speed, and said controlling means includes a means for determining a braking frequency which is a frequency of brake applications, an average braking effort which is an average of said first sensor signal, an average of said second sensor signal and an average of said third sensor signal, and estimating said driver's characteristic from said braking frequency, said average braking effort and said averages of said second and third sensor signals.

12. A control system according to claim 11 wherein said input means comprises said first input element which is in a form of a brake pedal and a master cylinder for producing a master cylinder fluid pressure in accordance with a movement of said brake pedal, said first sensor is in a form of a brake sensor for sensing a brake pedal force applied by the driver on said brake pedal, and said controlling means comprises a controller means for receiving said master cylinder pressure and producing a brake fluid pressure from said master cylinder pressure according to a predetermined transfer function which is a relationship between said brake fluid pressure and said master cylinder pressure, and an adjusting means for performing a fuzzy inference to estimate said driver's characteristic by using said braking frequency, said average braking effort and said averages of said second and third sensor signals.

13. A control system according to claim 12 wherein said second sensor is an accelerator position sensor for sensing an accelerator depression degree of an accelerator pedal of said vehicle, and said adjusting means comprises a first processing means for determining basic values of a gain determining parameter and a phase determining parameter in accordance with said driver's age, a second processing means for determining said braking frequency, said average braking effort which is an average of a series of instantaneous values of said braking effort, an average accelerator speed which is an average of a series of instantaneous values of a time rate of change of said accelerator depression degree and an average vehicle speed which is an average of a series of instantaneous values of said vehicle speed, a third processing means for storing data specifying first membership functions to decrease a phase compensation factor as said average vehicle speed increases and to increase said phase compensation factor as said average vehicle speed decreases, second membership functions to decrease said phase compensation factor as said average accelerator speed increases and to increase said phase compensation factor as said average accelerator speed decreases, third membership functions to increase a gain compensation factor as said braking frequency increases and to decrease said gain compensation factor as said braking frequency decreases, and fourth membership functions to increase said gain compensation factor as said average braking effort increases and to decrease said gain compensation factor as said average braking effort decreases, and determining said phase compensation factor and said gain compensation factor by the fuzzy inference using said first, second, third and fourth membership functions, and a fourth processing means for determining a final value of said gain parameter by multiplying said basic value of said gain parameter by said gain compensation factor and a final value of said phase parameter by multiplying said basic value of said phase parameter by said phase compensation factor and determining said transfer function of said controller means by said final values of said gain parameter and said phase parameter.

14. A control system according to claim 13 wherein said system further comprises a manual compensator adapted to be operated by the driver, for adjusting said gain parameter and said phase parameter.

15. A control system according to claim 3 wherein said input means comprises a first input element adapted to be operated by the driver to control a throttle opening of an engine system of said vehicle, said actuator of said actuator means is a throttle actuator for varying said throttle opening, said sensing means comprises a first sensor for sensing an operating condition of said engine system and producing a first sensor signal representing the condition of said engine system, a second sensor for sensing an operating condition of a brake system of said vehicle and producing a second sensor signal representing the condition of said brake system, and a third sensor for sensing a vehicle speed of said vehicle and producing a third sensor signal representing said vehicle speed, and said controlling means includes a means for estimating said driver's characteristic from said first, second and third sensor signals.

16. A control system according to claim 15 wherein said first input element is in a form of an accelerator pedal, said first sensor is in a form of an accelerator position sensor for sensing an accelerator depression degree of said accelerator pedal and producing said first sensor signal representing said accelerator depression degree, and said controlling means comprises a controller means for receiving said first sensor signal and producing said control signal to control said throttle actuator according to a transfer function which is a relationship between said throttle opening and said accelerator depression degree, and an adjusting means for performing a fuzzy inference to estimate said driver's characteristic by using said first, second and third sensor signals.

17. A control system according to claim 16 wherein said second sensor is a brake sensor for sensing a condition of a brake pedal of said vehicle, and said adjusting means comprises a first processing means for determining basic values of a gain determining parameter and a phase determining parameter in accordance with said driver's age, a second processing means for determining an average vehicle speed which is an average of a series of instantaneous values of said vehicle speed, a braking frequency which is a frequency of brake applications, an average accelerator speed which is an average of a series of instantaneous values of a time rate of change of said accelerator depression degree and a variance of said accelerator depression degree, a third processing means for storing data specifying first membership functions to decrease a phase compensation factor as said average vehicle speed increases and to increase said phase compensation factor as said average vehicle speed decreases, second membership functions to increase said phase compensation factor as said braking frequency increases and to decrease said phase compensation factor as said braking frequency decreases, third membership functions to decrease a gain compensation factor as said average accelerator speed increases and to increase said gain compensation factor as said average accelerator speed decreases, and fourth membership functions to decrease said gain compensation factor as said variance increases and to increase said gain compensation factor as said variance decreases, and determining said phase compensation factor and said gain compensation factor by the fuzzy inference using said first, second, third and fourth membership functions, and a fourth processing means for determining a final value of said gain parameter by multiplying said basic value of said gain parameter by said gain compensation factor and a final value of said phase parameter by multiplying said basic value of said phase parameter by said phase compensation factor and determining said transfer function of said controller means by said final values of said gain parameter and said phase parameter.

18. A vehicle comprising:
a chassis system which comprises an engine system for accelerating said vehicle by responding to an accelerator input produced by a driver of said vehicle, a brake system for braking said vehicle by responding to a brake input produced by the driver, and a steering system for steering said vehicle by responding to a steering input produced by the driver, one of said engine system, brake system and steering system being a controlled system whose response characteristic between a response of said controlled system and said input of said controlled system is variable;

an age determining means for producing an age signal representing a driver's age;

a sensing means for sensing a first vehicle operating condition which is an operating condition of said controlled system, a second vehicle operating condition which is an operating condition of a monitored system which is one of said engine system, brake system and steering system and which is distinct from said controlled system, and a third vehicle operating condition which is a vehicle speed of said vehicle; and a controlling means for estimating a driver's characteristic from said first, second and third conditions sensed by said sensing means, and adjusting said response characteristic of said controlled system in accordance with said driver's characteristic and said driver's age.

19. A vehicle according to claim 18 wherein one of said controlled system and monitored system is said engine system, and said sensing means comprises an engine condition sensor for sensing an operating condition of said engine system and a vehicle speed sensor for sensing said vehicle speed.

20. A vehicle according to claim 19 wherein said controlling means includes a means for varying at least one of gain and phase of said response characteristic in accordance with said driver's characteristic and said driver's age.

21. A vehicle according to claim 20 wherein said controlling means comprises an adjusting means for estimating said driver's characteristic by performing a fuzzy inference and adjusting said response characteristic.

22. A vehicle according to claim 21 wherein said age determining means comprises a reading device for reading information stored in a pocket memory device.

23. A vehicle according to claim 22 wherein said controlled system comprises an actuator for actuating said vehicle in response to a control signal, and said controlling means comprises a controller means for producing said control signal from said input of said controlled system according to a transfer function which is expressed as $K_D \cdot (1+sT_D)$ where $K_D$ is a gain determining parameter, $T_D$ is a phase determining parameter and s is a differential operator, and said adjusting means includes a means for determining said parameters of said transfer function in accordance with said driver's characteristic and said driver's age.

24. A vehicle according to claim 18 wherein said controlled system is said steering system; said monitored system is said engine system; said steering system comprises a steering wheel and a steering actuator for steering said vehicle in response to a steering control signal; said sensing means comprises a steering angle sensor for sensing a steering wheel angle of said steering wheel and producing a steering angle signal representing said steering wheel angle, an accelerator sensor for sensing an accelerator depression degree of an accelerator pedal of said vehicle and a vehicle speed sensor for sensing said vehicle speed; said controlling means comprises a controller means for producing said steering control signal from said steering wheel angle according to a predetermined transfer function between said control signal and said steering angle signal, and an adjusting means for estimating said driver's characteristic from said steering angle, accelerator depression degree and vehicle speed, and adjusting said transfer function in accordance with said driver's characteristic and said driver's age.

25. A vehicle according to claim 18 wherein said controlled system is said brake system; said monitored system is said engine system; said brake system comprises a brake pedal, a brake master cylinder for producing a master cylinder fluid pressure in accordance with a movement of said brake pedal, a wheel cylinder for receiving a brake fluid pressure and a hydraulic means for producing said brake fluid pressure in accordance with said master cylinder pressure according to a predetermined transfer function; said sensing means comprises a brake sensor for sensing a brake pedal force applied by the driver on said brake pedal, an accelerator sensor for sensing an accelerator depression degree of an accelerator pedal of said vehicle and a vehicle speed sensor for sensing said vehicle speed; and said controlling means comprises a controller means for determining said transfer function between said brake fluid pressure and said master cylinder fluid pressure, and an adjusting means for estimating said driver's characteristic from said brake pedal force, accelerator depression degree and vehicle speed, and adjusting said transfer function in accordance with said driver's characteristic and said driver's age.

26. A vehicle according to claim 18 wherein said controlled system is said engine system; said monitored system is said brake system; said engine system comprises an accelerator pedal, and a throttle actuator for varying a throttle opening of said engine system; said sensing means comprises an accelerator sensor for sensing an accelerator depression degree of said accelerator pedal, a brake sensor for sensing an operating condition of said brake system, and a vehicle speed sensor for sensing said vehicle speed; said controlling means comprises a controller means for determining a transfer function between said throttle opening and said accelerator depression degree, and an adjusting means for estimating said driver's characteristic from said accelerator depression degree, said operating condition of said brake system and said vehicle speed, and adjusting said transfer function in accordance with said driver's characteristic and said driver's age.

* * * * *